United States Patent
Wu (10) Patent No.: US 12,499,117 B2
(45) Date of Patent: Dec. 16, 2025

(54) INLINE STRUCTURED QUERY LANGUAGE QUERIES IN A SPREADSHEET

(71) Applicant: GOOGLE LLC, Mountain View, CA (US)

(72) Inventor: Xi Wu, Beijing (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/283,401

(22) PCT Filed: Dec. 8, 2022

(86) PCT No.: PCT/CN2022/137487
§ 371 (c)(1),
(2) Date: Sep. 21, 2023

(87) PCT Pub. No.: WO2024/119432
PCT Pub. Date: Jun. 13, 2024

(65) Prior Publication Data
US 2025/0036646 A1    Jan. 30, 2025

(51) Int. Cl.
*G06F 16/25* (2019.01)
*G06F 16/28* (2019.01)
*G06F 40/18* (2020.01)

(52) U.S. Cl.
CPC .......... *G06F 16/252* (2019.01); *G06F 16/287* (2019.01); *G06F 40/18* (2020.01)

(58) Field of Classification Search
None
See application file for complete search history.

(56) References Cited

U.S. PATENT DOCUMENTS

| 10,698,978 | B1 * | 6/2020 | Hatton | G06F 40/279 |
| 10,725,799 | B2 * | 7/2020 | Zusman | G06F 40/18 |
| 11,934,801 | B2 * | 3/2024 | Rahmani | G06F 8/33 |
| 2004/0111666 | A1 | 6/2004 | Hollcraft | |
| 2009/0158251 | A1 * | 6/2009 | Angrish | G06F 16/258 |
| | | | | 707/999.102 |

(Continued)

FOREIGN PATENT DOCUMENTS

CN    109062954    12/2018

OTHER PUBLICATIONS

Business Modeling Using SQL Spreadsheets (Year: 2003).*

(Continued)

*Primary Examiner* — Kim T Nguyen
(74) *Attorney, Agent, or Firm* — Gray Ice Higdon (57) ABSTRACT

Techniques are described herein for implementing inline structured query language (SQL) queries, in a spreadsheet application. A method includes: receiving, via a user interface of a spreadsheet application, first input including an SQL statement, the first input being provided in association with a first cell in a first column and a first row in a spreadsheet in the spreadsheet application, and the SQL statement including a reference to a second column in the spreadsheet; storing the SQL statement in association with the first cell in the spreadsheet; executing the SQL statement to obtain a result, wherein executing the SQL statement includes obtaining at least one value from the second column in the spreadsheet; and displaying the result in association with the first cell in the spreadsheet.

20 Claims, 6 Drawing Sheets

(56) References Cited

U.S. PATENT DOCUMENTS

| | | | |
|---|---|---|---|
| 2018/0239617 A1* | 8/2018 | Zusman | G06F 9/544 |
| 2018/0302393 A1 | 10/2018 | Mazur | |
| 2019/0147031 A1* | 5/2019 | Dvorak | G06F 40/18 |
| | | | 715/219 |
| 2021/0397420 A1 | 12/2021 | Stachura | |
| 2024/0320222 A1* | 9/2024 | Sheinin | G06F 16/24547 |
| 2025/0036646 A1* | 1/2025 | Wu | G06F 16/287 |

OTHER PUBLICATIONS

Bierly, M. "How to Switch from Excel to SQL"; retrieved from Internet: https://mode.com/blog/learn-sql-using-excel/#formulas-to-queries; 13 pages; dated Dec. 10, 2021.

Collins, B. "Google Sheets Query Function: The Most Powerful Function in Google Sheets"; retrieved from the Internet: https://www.benlcollins.com/spreadsheets/google-sheets-query-sql; 147 pages; dated May 25, 2022.

Bendre, M., "Towards Unifying Spreadsheets with Databases for Ad-Hoc Interactive Data Management at Scale"; Dissertation submitted in partial fulfillment of the requirements for the degree of Doctor of Philosophy in Computer Science in the Graduate College of the Univ. of IL; retrieved from URL:https://www.ideals.illinois.edu/items/109501 [Apr. 4, 2023]; 189 pages; dated 2018.

Bendre, M. et al., Towards a Holistic Integration of Spreadsheets with Databases: A Scalable Storage Engine for Presentational Data Management; 2018 IEEE 34th International Conference on Data Engineering (ICDE); 52 pages; dated Apr. 16, 2018.

European Patent Office; International Search Report and Written Opinion issued in Application No. PCT/CN/2022/137487; 14 pages; dated May 2, 2023.

\* cited by examiner

INLINE STRUCTURED QUERY LANGUAGE QUERIES IN A SPREADSHEET

BACKGROUND

Spreadsheet applications may implement a spreadsheet programming language that includes various functions that operate on data in a cell or range of cells in a spreadsheet and/or on other inputs in order to produce various outputs. Non-limiting examples of functions in a spreadsheet programming language include sum, count, average, length, concatenate, maximum, minimum, and lookup functions.

Users may manually enter data into a spreadsheet that could be obtained programmatically. For example, a user may manually enter last names into a column in a first table that could be obtained instead by using a function in a spreadsheet programming language to extract the last names from a column in a second table that stores full names. This manual approach, however, may be an inefficient use of user time and computer storage resources, as it may result in excessive data entry, client device usage, and duplication of the same data in multiple places in a spreadsheet. Additionally, when the underlying data changes in one location (e.g., a user's last name changes), the change must be manually propagated to all places in the spreadsheet where the data is used.

Users who are not experienced spreadsheet application users may be unaware of or uncomfortable with using functions in the spreadsheet programming language that are usable to programmatically obtain data to populate certain cells in a spreadsheet. For example, users may have difficulty due to unfamiliar and/or complex syntax associated with functions in the spreadsheet programming language. Additionally, users may not understand how to combine together multiple functions in the spreadsheet programming language to form a program to obtain data to populate certain cells in a spreadsheet.

Other users may be able to write their own programs that use multiple functions in the spreadsheet programming language to obtain data, but these programs may be inefficient solutions that require excess processing and memory resources compared to more efficient solutions for obtaining the same data. Moreover, manually crafting the programs can often take an extended amount of time (e.g., to identify appropriate function(s), for trial and error, etc.) and, as a result, can lead to excess usage of power resources and/or other computational resource(s) of a client device used in manually crafting the programs. This can be exacerbated when the client device has a relatively small display and/or a software keyboard, both of which can prolong the amount of time needed to craft the programs.

SUMMARY

Techniques described herein relate to implementing inline SQL queries, in a spreadsheet application, to enable manipulation of data and spreadsheets. By enabling use of inline SQL queries within a spreadsheet application, the system may provide for more efficient use of computational resources in creating and editing spreadsheets by reducing data entry (including reducing manual duplication of the same data in multiple places) and client device usage. Additionally, enabling use of inline SQL queries may allow users to utilize more efficient solutions for obtaining data as compared to programs written in the spreadsheet programming language, in cases where the programs written in the spreadsheet programming language are comparatively inefficient solutions.

For example, certain users may be more familiar with SQL as compared to a spreadsheet programming language, and those users may write more efficient programs in SQL as compared to programs they write in the spreadsheet programming language. In another example, certain data manipulation tasks may be more efficiently performed by programs written in SQL as compared to programs written in the spreadsheet programming language. Accordingly, implementing inline SQL queries may allow for a reduction in usage of power resources and/or other computational resource(s) of a client device.

In various implementations, a spreadsheet application may receive user input, in association with a cell in a spreadsheet, including a structured query language (SQL) statement. The spreadsheet application may parse the SQL statement, retrieve data (e.g., from one or more other cells in the spreadsheet and/or one or more other cells in additional spreadsheet(s)) that is referenced in the SQL statement, and execute the SQL statement to obtain a result. The result may then be displayed in the cell in the spreadsheet.

In various implementations, a method implemented by one or more processors may include: receiving, via a user interface of a spreadsheet application, first input including a structured query language (SQL) statement, the first input being provided in association with a first cell in a first column and a first row in a spreadsheet in the spreadsheet application, and the SQL statement including a reference to a second column in the spreadsheet; storing the SQL statement in association with the first cell in the spreadsheet; executing the SQL statement to obtain a result, wherein executing the SQL statement includes obtaining at least one value from the second column in the spreadsheet; and displaying the result in association with the first cell in the spreadsheet.

In some implementations, the SQL statement further includes a reference to a second row in the spreadsheet; and obtaining the at least one value from the second column in the spreadsheet includes obtaining a value of a second cell in the spreadsheet, the second cell being located at an intersection of the second column and the second row.

In some implementations, obtaining the at least one value from the second column in the spreadsheet includes obtaining a value of a second cell in the spreadsheet, the second cell being located at an intersection of the second column and the first row.

In some implementations, the SQL statement further includes a reference to an additional spreadsheet, a column in the additional spreadsheet, and a row in the additional spreadsheet; and executing the SQL statement further includes obtaining a value of a cell in the additional spreadsheet, the cell in the additional spreadsheet being located at an intersection of the column in the additional spreadsheet and the row in the additional spreadsheet.

In some implementations, displaying the result in association with the first cell in the spreadsheet includes displaying the result at a location, in the spreadsheet, at an intersection of the first column and the first row.

In some implementations, the method further includes: in response to a selection of the first cell via the user interface of the spreadsheet application, displaying the SQL statement in a formula bar, the formula bar being located in the user interface of the spreadsheet application, at a position that is outside of the first cell.

In some implementations, the SQL statement is executed by the spreadsheet application. In some implementations, the SQL statement is executed by a user device. In some implementations, the SQL statement is executed by a remote server.

In some additional or alternative implementations, a computer program product may include one or more computer-readable storage media having program instructions collectively stored on the one or more computer-readable storage media. The program instructions may be executable to: receive, via a user interface of a spreadsheet application, first input including a structured query language (SQL) statement, the first input being provided in association with a first column in a spreadsheet in the spreadsheet application, and the SQL statement including a reference to a second column in the spreadsheet; storing the SQL statement in association with the first column in the spreadsheet; and for each of one or more cells in the first column in the spreadsheet: executing the SQL statement to obtain a result, wherein executing the SQL statement includes obtaining at least one value from the second column in the spreadsheet; and displaying the result in association with the cell in the first column in the spreadsheet.

In some implementations, storing the SQL statement in association with the first column in the spreadsheet includes storing the SQL statement in association with each of the one or more cells in the first column in the spreadsheet.

In some implementations, receiving the first input includes receiving, via the user interface of the spreadsheet application, a selection of a column header of the first column in the spreadsheet.

In some implementations, the SQL statement further includes a reference to a row in the spreadsheet; and obtaining the at least one value from the second column in the spreadsheet includes obtaining a value of a second cell in the spreadsheet, the second cell being located at an intersection of the second column and the row.

In some implementations, obtaining the at least one value from the second column in the spreadsheet includes obtaining a value of a second cell in the spreadsheet, the second cell being located at an intersection of the second column and a row of the cell.

In some implementations, displaying the result in association with the cell in the first column in the spreadsheet comprises displaying the result at a location, in the spreadsheet, at an intersection of the first column and a row of the cell.

In some implementations, the program instructions are further executable to, in response to a selection of the column header of the first column, via the user interface of the spreadsheet application, display the SQL statement in a formula bar, the formula bar being located in the user interface of the spreadsheet application.

In some additional or alternative implementations, a system may include a processor, a computer-readable memory, one or more computer-readable storage media, and program instructions collectively stored on the one or more computer-readable storage media. The program instructions may be executable to: receive, via a user interface of a spreadsheet application, first input including a structured query language (SQL) statement, the first input being provided in association with a first cell in a first column and a first row in a spreadsheet in the spreadsheet application, and the SQL statement including a reference to a second column in the spreadsheet; store the SQL statement in association with the first cell in the spreadsheet; execute the SQL statement to obtain a result, wherein executing the SQL statement includes obtaining at least one value from the second column in the spreadsheet; and display the result in association with the first cell in the spreadsheet.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
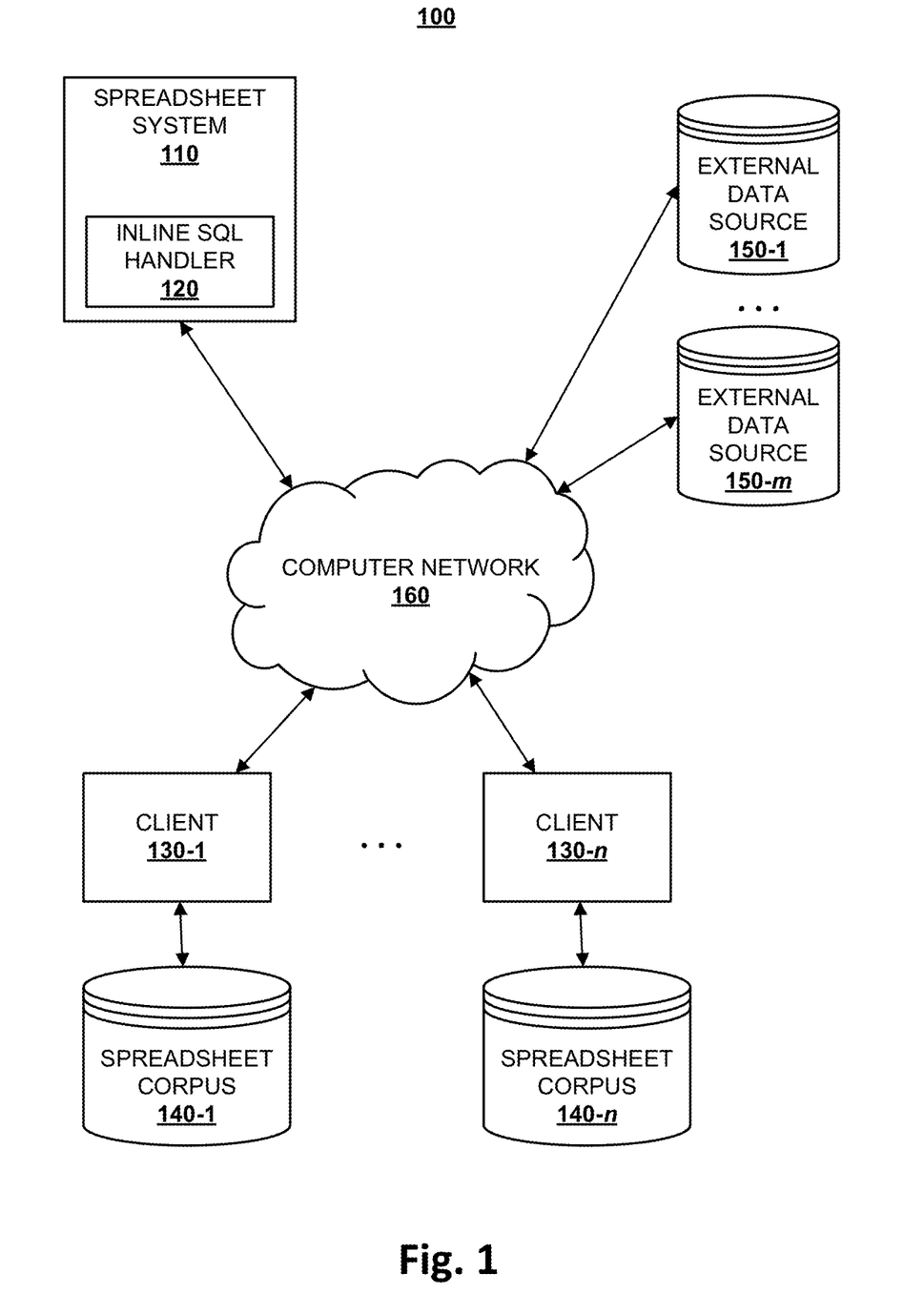
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a spreadsheet system 110, may be implemented using one or more server computing devices that form what is sometimes referred to as a "cloud infrastructure," although this is not required.

In implementations, the environment 100 may include a spreadsheet system 110 that implements a spreadsheet application that is accessible from various clients, including clients 130-1, . . . , 130-*n* that may be included in the environment 100, through either a thin client interface, such as a web browser (e.g., a web-based spreadsheet application), or a program interface. In implementations, the spreadsheet application that is implemented by the spreadsheet system 110 may be a software as a service (SaaS) spreadsheet application. The spreadsheet system 110 and the clients 130-1, . . . , 130-*n* may be in communication via a computer network 160, which may be any suitable network including any combination of a local area network (LAN), wide area network (WAN), or the Internet. The spreadsheet system 110 may include, among other things, inline SQL handler 120 that is configured to perform selected aspects of the present disclosure in order to implement inline SQL queries to enable manipulation of data and spreadsheets, in spreadsheets that are created, modified, and/or viewed using one or more of the clients 130-1, . . . , 130-n.

Each of the clients 130-1, . . . , 130-n may be, for example, a user computing device that is used by a user to access a spreadsheet application via spreadsheet application user interface, such as a SaaS spreadsheet application, that is provided by the spreadsheet system 110, e.g., through a web browser. In an example, the clients 130-1, . . . , 130-n may be user computing devices associated with an individual or an entity or organization such as a business (e.g., financial institute, bank, etc.), non-profit, club, university, government agency, or any other organization that uses a spreadsheet application. For example, a business may operate a spreadsheet application to create, modify, and/or view one or more spreadsheets to manage financial records, business records, client lists, and so forth.

In various implementations, the environment 100 may include spreadsheet corpuses 140-1, . . . , 140-n that are accessible to the clients 130-1, . . . , 130-n via the computer network 160 or another network. Each of the spreadsheet corpuses 140-1, . . . , 140-n may include multiple spreadsheets created by one or more of the clients 130-1, . . . , 130-n, e.g., using the spreadsheet system 110. In an example, the spreadsheet corpuses 140-1, . . . , 140-n may include a set of spreadsheets created, edited, or viewed by users of one or more of the clients 130-1, . . . , 130-n associated with a particular entity or organization.

The inline SQL handler 120 may be configured to receive user input, in association with a cell in a spreadsheet, including a structured query language (SQL) statement. The inline SQL handler 120 may parse the SQL statement, retrieve data (e.g., from one or more other cells in the spreadsheet and/or one or more other cells in additional spreadsheet(s) accessible to the spreadsheet system 110) that is referenced in the SQL statement, and execute the SQL statement to obtain a result. The result may then be displayed in the cell in the spreadsheet.

In some implementations, the inline SQL handler 120 may extend the functionality of the spreadsheet system 110 by implementing a built-in function in the spreadsheet application programming language that takes, as an argument, an SQL statement that is written in the SQL programming language, which may be different from the spreadsheet application programming language. Accordingly, the inline SQL handler 120 may allow for use of an additional programming language, i.e., the SQL programming language, to manipulate data inside of the spreadsheet application of the spreadsheet system 110.

In various implementations, the environment 100 may include external data sources 150-1, . . . , 150-m that store data that may be accessible to the clients 130-1, . . . , 130-n and/or the inline SQL handler 120 of the spreadsheet system 110 via the computer network 160 or another network. In implementations, data in the external data sources 150-1, . . . , 150-m may be retrieved, manipulated, and/or otherwise used as inputs to SQL queries that are processed by the inline SQL handler 120.

Figure 2:
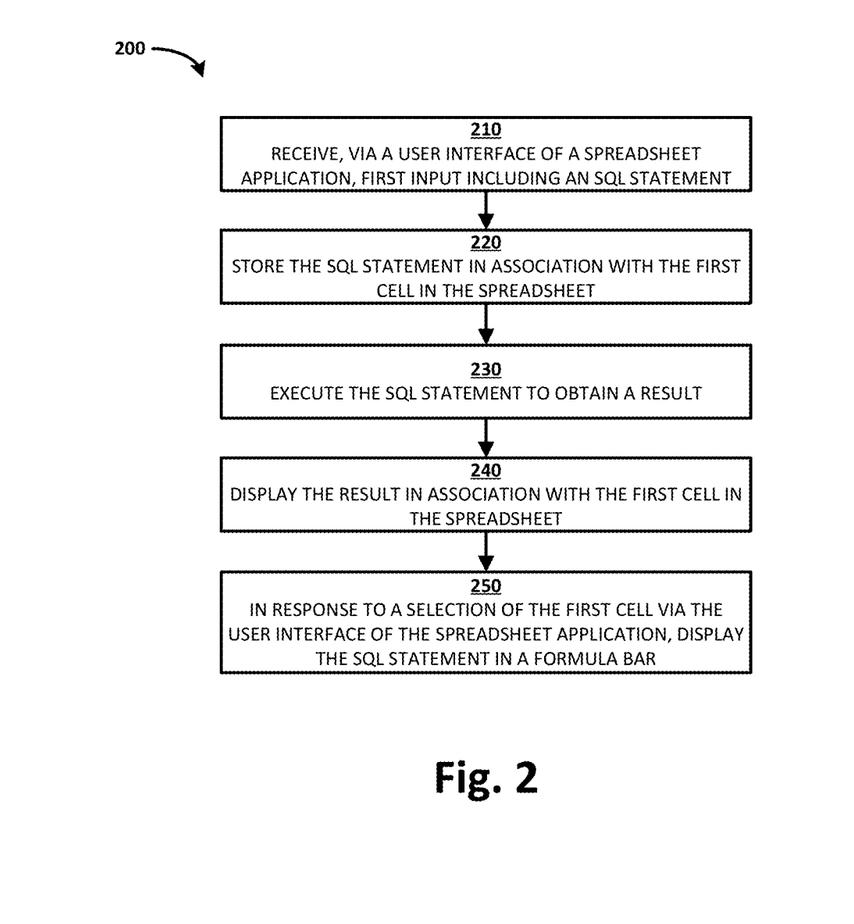
FIG. 2 depicts a flowchart illustrating an example method for practicing selected aspects of the present disclosure.

FIG. 2 depicts a flowchart illustrating an example method 200 of implementing inline SQL queries, in a spreadsheet application, in accordance with implementations disclosed herein. For convenience, the operations of the method 200 are described with reference to a system that performs the operations. This system may include various components of various computer systems, such as one or more components of the spreadsheet system 110. Moreover, while operations of method 200 are shown in a particular order, this is not meant to be limiting. One or more operations may be reordered, omitted, or added.

At block 210, the system may receive, via a user interface of a spreadsheet application, first input including a structured query language (SQL) statement. The first input may be provided in association with a first cell in a first column and a first row in a spreadsheet in the spreadsheet application, and the SQL statement may include a reference to a second column in the spreadsheet. In some implementations, at block 210, the spreadsheet system 110 and/or the inline SQL handler 120 may receive, via the user interface of the spreadsheet application, the first input including the SQL statement.

Still referring to block 210, in an example, the spreadsheet application may be a web-based spreadsheet application, and the user interface of the spreadsheet application may be displayed in a web browser running on one of the clients 130-1, . . . , 130-n. A user may interact with the user interface of the spreadsheet application displayed in the web browser to provide the first input. For example, by clicking or tapping on a cell in the spreadsheet rendered in the user interface of the spreadsheet application, the user may select the cell, hereinafter referred to as the first cell.

In the example, the rows in the spreadsheet may be sequentially labeled with numbers (e.g., starting with "1"), and the columns in the spreadsheet may be sequentially labeled with letters (e.g., starting with "A"). The first cell may be at an intersection of the third column (e.g., labeled with the letter "C") and the fourth row (e.g., labeled with the number "4") in the spreadsheet. The first cell may be referred to as "C4" based on the labels for the column ("C") and row ("4") associated with the first cell. The row (in this example, "4") associated with the first cell is hereinafter referred to as the first row, and the column (in this example, "C") associated with the first cell is hereinafter referred to as the first column.

Still referring to block 210, in some implementations, a user may click or tap on the first cell (such as cell "C4" in the previous example) and then provide the first input including the SQL statement that includes the reference to the second column (e.g., the column labeled with the letter "A") in the spreadsheet.

Still referring to block 210, in some implementations, the SQL statement may further include a reference to a second row (e.g., the row labeled with the number "3") in the spreadsheet.

Still referring to block 210, in some implementations, the SQL statement may further include a reference to an additional spreadsheet, a column in the additional spreadsheet, and a row in the additional spreadsheet Still referring to FIG. 2, at block 220, the system may store the SQL statement in association with the first cell in the spreadsheet. In some implementations, at block 220, the inline SQL handler 120 and/or the spreadsheet system 110 may store the SQL statement in association with the first cell in the spreadsheet.

In the above example, subsequent to the user selecting the cell "C4" by clicking or tapping on the cell in the spreadsheet that is at the intersection of the column labeled "C" and the row labeled "4" and then providing the first input including the SQL statement at block 210, the SQL statement is then stored in association with the cell "C4" in the spreadsheet at block 220.

Still referring to FIG. 2, at block 230, the system may execute the SQL statement to obtain a result. Executing the SQL statement may include obtaining at least one value from the second column in the spreadsheet. In some implementations, at block 230, the inline SQL handler 120 may execute the SQL statement to obtain the result. In the process of executing the SQL statement, the inline SQL handler 120 may obtain the at least one value from the second column in the spreadsheet. In the above example, in which the SQL statement includes the reference to column "A", at block 230, the inline SQL handler 120 may obtain a value from column "A" in the process of executing the SQL statement.

Still referring to block 230, in some implementations, obtaining the at least one value from the second column in the spreadsheet includes obtaining a value of a second cell in the spreadsheet, the second cell being located at an intersection of the second column and the first row. For example, in the case where a row is not specified in the SQL statement, the inline SQL handler 120 may obtain a value from the cell at the intersection of the referenced column (i.e., the second column, which is column "A" in the example) and the row corresponding to the location of the cell in which the SQL statement is stored at block 220 (i.e., the first row, which is row "4" in the example).

Still referring to block 230, in some implementations, obtaining the at least one value from the second column in the spreadsheet includes obtaining a value of a second cell in the spreadsheet, the second cell being located at an intersection of the second column and the second row. For example, in the case where a row (e.g., the second row) is specified in the SQL statement, the inline SQL handler 120 may obtain a value from the cell at the intersection of the referenced column (i.e., the second column, which is column "A" in the example) and the referenced row (i.e., the second row, which is row "3" in the example).

In some implementations, in the case where the SQL statement included in the first input received at block 210 further includes the reference to the additional spreadsheet, the column in the additional spreadsheet, and the row in the additional spreadsheet, executing the SQL statement at block 230 further includes obtaining a value of a cell in the additional spreadsheet, the cell in the additional spreadsheet being located at an intersection of the column in the additional spreadsheet and the row in the additional spreadsheet.

Still referring to block 230, in some implementations, the SQL statement is executed by the spreadsheet application (e.g., by spreadsheet system 110). In other implementations, the SQL statement is executed by a user device (e.g., by one of the clients 130-1, . . . , 130-n). In still other implementations, the SQL statement is executed by a remote server (e.g., by one or more server computing devices that form what is sometimes referred to as a "cloud infrastructure").

Still referring to FIG. 2, at block 240, the system may display the result in association with the first cell in the spreadsheet. In some implementations, at block 240, the spreadsheet system 110 and/or the inline SQL handler 120 may display the result from block 230 in association with the first cell in the spreadsheet.

In some implementations, displaying the result in association with the first cell in the spreadsheet includes displaying the result at a location, in the spreadsheet, at an intersection of the first column and the first row. In the case of the previous example, the inline SQL handler 120 may cause the result obtained at block 230 to be displayed within the cell "C4" in the spreadsheet, which is at the intersection of the first column (column "C" in the example) and the first row (row "4" in the example).

Still referring to FIG. 2, at block 250, in response to a selection of the first cell via the user interface of the spreadsheet application, the system may display the SQL statement in a formula bar, the formula bar being located in the user interface of the spreadsheet application, at a position that is outside of the first cell. In some implementations, at block 250, in response to a selection of the first cell via the user interface of the spreadsheet application, the spreadsheet system 110 and/or the inline SQL handler 120 may cause the SQL statement included in the first input received at block 210 and stored in association with the first cell at block 220, to be displayed in the formula bar.

In some implementations, at block 250, a user may also provide additional input comprising an update to the SQL statement that is displayed in the formula bar. For example, the user may correct an error in the SQL statement, provide a new SQL statement, and/or add or remove elements from the SQL statement. In this case, flow may return to block 220, with the updated SQL statement being stored.

Figure 3:
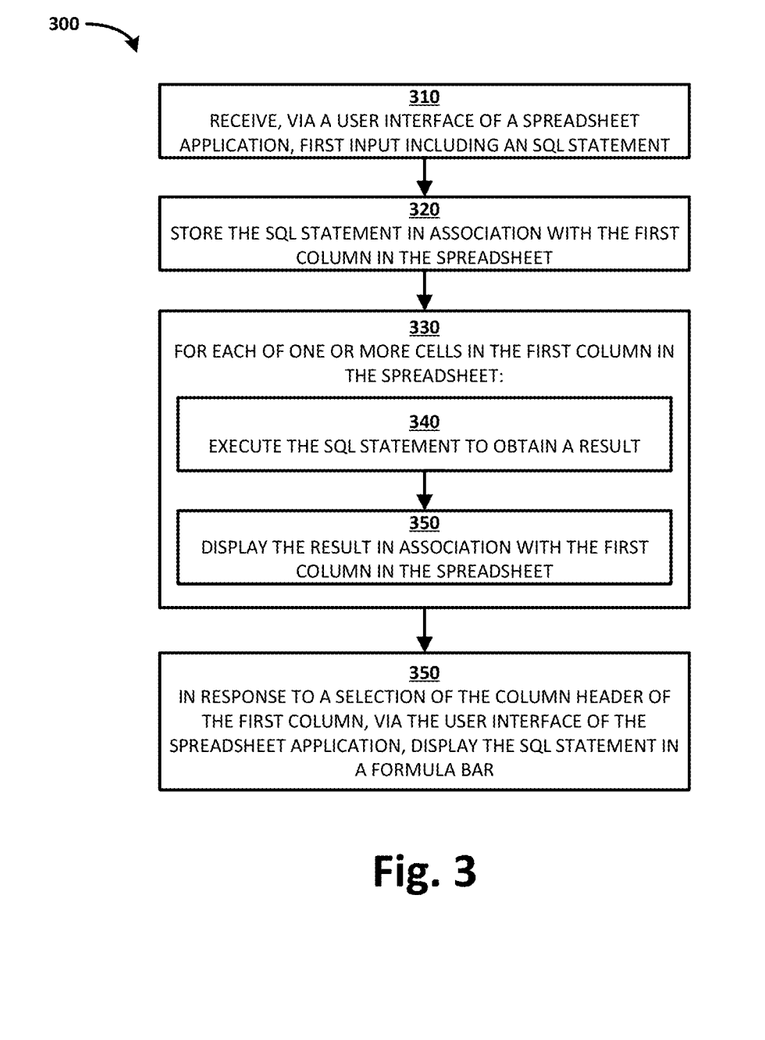
FIG. 3 depicts another flowchart illustrating an example method for practicing selected aspects of the present disclosure.

FIG. 3 is a flowchart illustrating an example method 300 of implementing inline SQL queries, in a spreadsheet application, in accordance with implementations disclosed herein. For convenience, the operations of the flowchart are described with reference to a system that performs the operations. This system may include various components of various computer systems, such as one or more components of the spreadsheet system 110. Moreover, while operations of method 300 are shown in a particular order, this is not meant to be limiting. One or more operations may be reordered, omitted, or added.

At block 310, the system may receive, via a user interface of a spreadsheet application, first input including a structured query language (SQL) statement. The first input may be provided in association with a first column in a spreadsheet in the spreadsheet application, and the SQL statement may include a reference to a second column in the spreadsheet. In some implementations, at block 310, the spreadsheet system 110 and/or the inline SQL handler 120 may receive, via the user interface of the spreadsheet application, the first input including the SQL statement.

Still referring to block 310, in an example, the spreadsheet application may be a web-based spreadsheet application, and the user interface of the spreadsheet application may be displayed in a web browser running on one of the clients 130-1, . . . , 130-n. A user may interact with the user interface of the spreadsheet application displayed in the web browser to provide the first input. For example, by clicking or tapping on a column header of a column in the spreadsheet rendered in the user interface of the spreadsheet application, the user may select the column, hereinafter referred to as the first column. In the example, the rows in the spreadsheet may be sequentially labeled with numbers (e.g., starting with "1"), and the columns in the spreadsheet may be sequentially labeled with letters (e.g., starting with "A"). In the example, the first column may be labeled with the letter "C", based on its position among the columns in the spreadsheet, which may be sequentially labeled starting with "A".

Still referring to block 310, in some implementations, receiving the first input includes receiving, via the user interface of the spreadsheet application, a selection of a column header of the first column in the spreadsheet. For example, a user may click or tap on the column header that is associated with the first column (e.g., the column header with the label "C" in the previous example) and then provide the first input including the SQL statement that includes the reference to the second column (e.g., the column labeled with the letter "A") in the spreadsheet.

Still referring to block 310, in some implementations, the SQL statement may further include a reference to a row (e.g., the row labeled with the number "3") in the spreadsheet.

Still referring to block 310, in some implementations, the SQL statement may further include a reference to an additional spreadsheet, a column in the additional spreadsheet, and a row in the additional spreadsheet.

Still referring to FIG. 3, at block 320, the system may store the SQL statement in association with the first column in the spreadsheet. In some implementations, at block 320, the inline SQL handler 120 and/or the spreadsheet system 110 may store the SQL statement in association with the first column in the spreadsheet.

In some implementations, storing the SQL statement in association with the first column in the spreadsheet may include storing the SQL statement in association with each of the one or more cells in the first column in the spreadsheet. In other implementations, storing the SQL statement in association with the first column in the spreadsheet may include storing the SQL statement in association with a column header of the first column in the spreadsheet.

In the above example, subsequent to the user selecting the column "C" by clicking or tapping on the column header with the label "C" and then providing the first input including the SQL statement at block 310, the SQL statement is then stored in association with the column "C" in the spreadsheet at block 320.

Still referring to FIG. 3, at block 330, for each of one or more cells in the first column in the spreadsheet, the system may execute the SQL statement to obtain a result at block 340 and display the result in association with the cell in the first column in the spreadsheet at block 350.

In particular, at block 340, executing the SQL statement may include obtaining at least one value from the second column in the spreadsheet. In some implementations, at block 340, the inline SQL handler 120 may execute the SQL statement to obtain the result. In the process of executing the SQL statement, the inline SQL handler 120 may obtain the at least one value from the second column in the spreadsheet. In the above example, in which the SQL statement includes the reference to column "A", at block 340, the inline SQL handler 120 may obtain a value from column "A" in the process of executing the SQL statement.

Still referring to block 340, in some implementations, obtaining the at least one value from the second column in the spreadsheet includes obtaining a value of a second cell in the spreadsheet, the second cell being located at an intersection of the second column and a row of the cell. For example, in the case where a row is not specified in the SQL statement, the inline SQL handler 120 may obtain a value from the cell at the intersection of the referenced column (i.e., the second column, which is column "A" in the example) and the row corresponding to the location of the cell for which the SQL statement is being executing to obtain a result.

Still referring to block 340, in some implementations, obtaining the at least one value from the second column in the spreadsheet includes obtaining a value of a second cell in the spreadsheet, the second cell being located at an intersection of the second column and the row. For example, in the case where a row (e.g., the second row) is specified in the SQL statement, the inline SQL handler 120 may obtain a value from the cell at the intersection of the referenced column (i.e., the second column, which is column "A" in the example) and the referenced row (i.e., the second row, which is row "3" in the example).

In some implementations, in the case where the SQL statement included in the first input received at block 310 further includes the reference to the additional spreadsheet, the column in the additional spreadsheet, and the row in the additional spreadsheet, executing the SQL statement at block 340 further includes obtaining a value of a cell in the additional spreadsheet, the cell in the additional spreadsheet being located at an intersection of the column in the additional spreadsheet and the row in the additional spreadsheet.

Still referring to block 340, in some implementations, the SQL statement is executed by the spreadsheet application (e.g., by spreadsheet system 110). In other implementations, the SQL statement is executed by a user device (e.g., by one of the clients 130-1, . . . , 130-n). In still other implementations, the SQL statement is executed by a remote server (e.g., by one or more server computing devices that form what is sometimes referred to as a "cloud infrastructure").

At block 350, displaying the result in association with the cell in the first column in the spreadsheet may include the spreadsheet system 110 and/or the inline SQL handler 120 displaying the result in association with the cell in the first column in the spreadsheet. In some implementations, displaying the result in association with the cell in the first column in the spreadsheet includes displaying the result at a location, in the spreadsheet, at an intersection of the first column and a row of the cell.

After block 340 has been performed for each of the one or more cells in the first column in the spreadsheet, the inline SQL handler 120 may have caused the results obtained at block 340 to be displayed within the one or more cells in the first column in the spreadsheet (in the case of the example, column "C").

Still referring to FIG. 3, at block 360, in response to a selection of the column header of the first column, via the user interface of the spreadsheet application, the system may display the SQL statement in a formula bar, the formula bar being located in the user interface of the spreadsheet application. In some implementations, at block 360, in response to a selection of the column header of the first column, via the user interface of the spreadsheet application, the spreadsheet system 110 and/or the inline SQL handler 120 may cause the SQL statement included in the first input received at block 310 and stored in association with the first column at block 320, to be displayed in the formula bar.

In some implementations, at block 360, a user may also provide additional input comprising an update to the SQL statement that is displayed in the formula bar. For example, the user may correct an error in the SQL statement, provide a new SQL statement, and/or add or remove elements from the SQL statement. In this case, flow may return to block 320, with the updated SQL statement being stored.

Figure 4A:
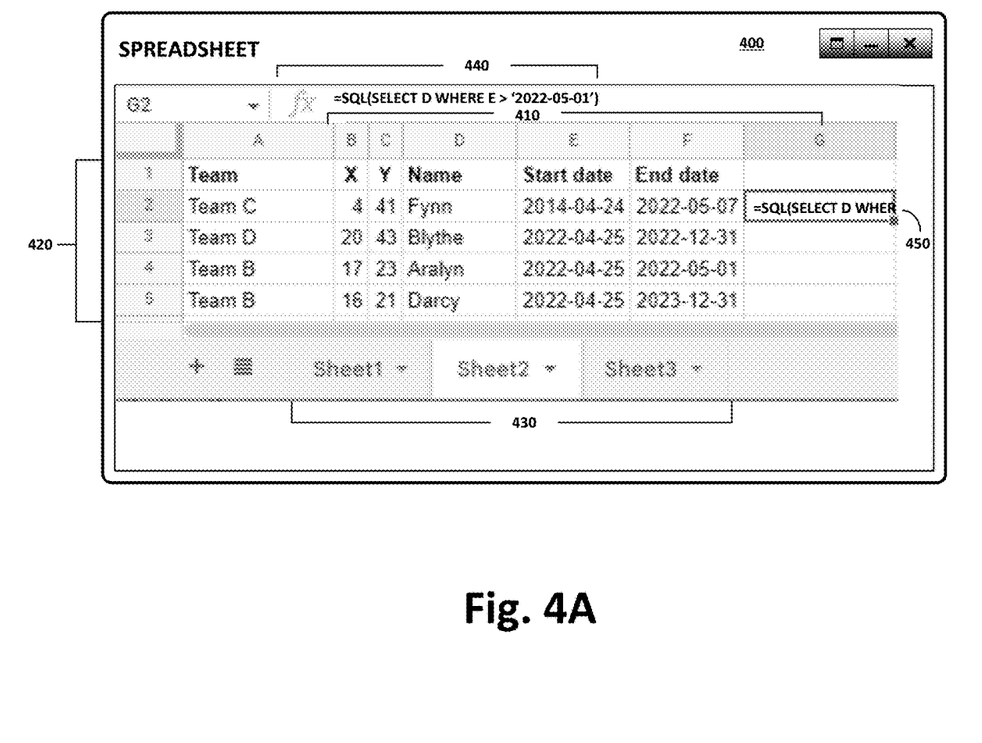
FIGS. 4A and 4B depict example applications of techniques described herein, in accordance with various implementations.
Figure 4B:
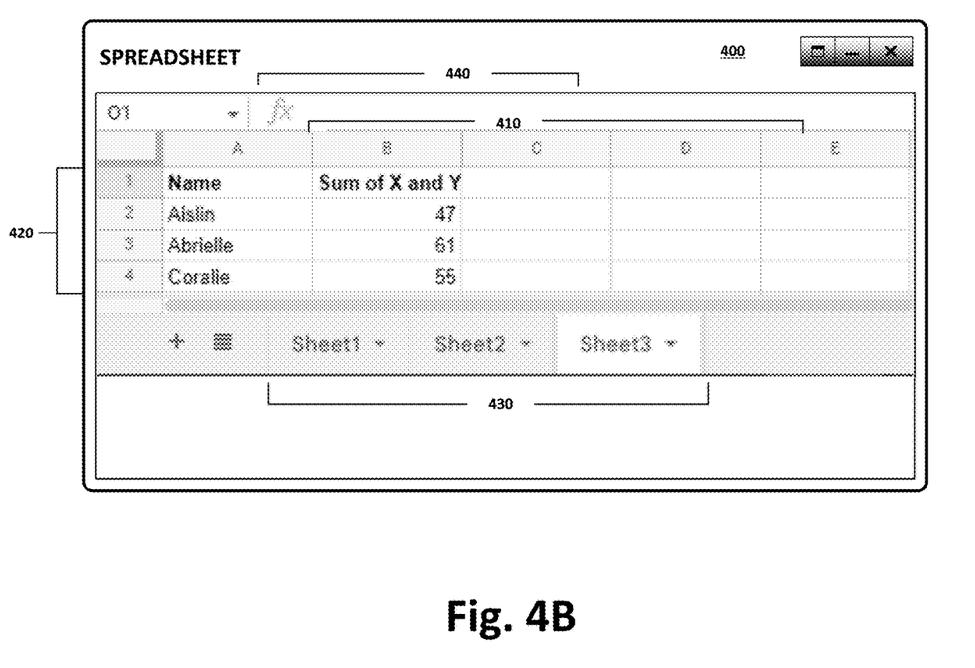

FIGS. 4A and 4B depict examples of implementing inline SQL queries, in a spreadsheet application. A graphical user interface ("GUI") 400 is depicted that may be used by a spreadsheet application user to view, create, or edit a spreadsheet (e.g., "Spreadsheet"). In the example of FIG. 4A, Sheet2 of Spreadsheet includes a "Team" column (A), an "X" column (B), a "Y" column (C), a "Name" column (D), a "Start date" column (E), and an "End date" Column (F). The column labels 410 (e.g., A through G in FIG. 4A) may be used as column names, the row labels 420 (e.g., 1 through 5 in FIG. 4A) may be used as row identifiers (i.e., ROW_ID), and the sheet names 430 may be used as sheet names in an SQL statement, such as the SQL statement shown in formula bar 440.

A user may select a cell, such as cell 450 in FIG. 4A, and input an SQL statement. For example, the user may provide an SQL statement to be executed, such as "SELECT D WHERE E>'2022-05-01'", using a function "=SQL ('SQL_STATEMENT')". The "=SQL( )" function may be a function in a spreadsheet programming language that accepts, as an argument ("SQL_STATEMENT"), a statement written in structured query language, which may be a programming language that is different from the spreadsheet programming language. In this example, the user may click or tap on the cell 450 and then input, "=SQL(SELECT D WHERE E>'2022-05-01')", which may be displayed in the cell 450 and/or in the formula bar 440 as it is being input.

In some implementations, the SQL statement may include references to SHEET(<sheet_name>) table to reference a sheet. For example, the following SQL statement may be used in the example of FIG. 4A:

SELECT A FROM SHEET("Sheet2") WHERE ROW_ID=2

In some implementations, the FROM clause may be omitted if manipulating the current sheet. For example, the following SQL statement may be used in the example of FIG. 4A:

SELECT A WHERE ROW_ID=2

In some implementations, column name and ROW_ID may be used to reference a cell in a sheet. For example, the following SQL statement may be used in the example of FIG. 4A:

SELECT D FROM SHEET("Sheet2") WHERE ROW_ID=2

In some implementations, "ROW_ID=xxx" may be omitted if the manipulation is for current row. For example, the following SQL statement may be used in the example of FIG. 4A:

SELECT D FROM SHEET("Sheet2")

In some implementations, a predefined SQL function, CELL([<sheet_name>!]<column_name> <ROW_ID>), may be used to reference a cell. For example:

CELL("D2") or CELL("Sheet2!D2")

In some implementations, a user may use an SQL statement in place of one or more built-in functions (i.e., functions in a spreadsheet programming language). In particular, two or more cells may be added using a built-in function. For example:

B2+C2

As an alternative to using the built-in function, two cells or more may be added using an SQL statement. For example, the following SQL statement may be used in the example of FIG. 4A:

$$\text{SELECT } B+C \text{ WHERE ROW\_ID} = 2$$

In the case where the current cell is at row 2, "WHERE ROW_ID=2" may be omitted from the SQL statement. For example, the following SQL statement may be used in the example of FIG. 4A:

SELECT B+C

As another example, a built-in function may be used to sum up cells in a particular column. For example:

SUM(B2:B10)

As an alternative to using the built-in function, cells in a particular column may be summed up using an SQL statement. For example, the following SQL statement may be used in the example of FIG. 4A:

SELECT SUM(B) WHERE ROW_ID BETWEEN 2 AND 10

As another example, a built-in function may be used to count rows associated with a particular team and having a first date that is earlier than the present date and a second date that is later than the present date. For example:

COUNTIFS(A:A, "Team B", E:E, ">="&TODAY( ), F:F, "<="&TODAY( ))

As an alternative to using the built-in function, an SQL statement may be used to count rows associated with a particular team and having a first date that is earlier than the present date and a second date that is later than the present date. For example, the following SQL statement may be used in the example of FIG. 4A:

SELECT COUNT(*) WHERE A="Team B" AND E>=TODAY( ) AND F<=TODAY( )

In some implementations, a user may use an SQL statement to accomplish a task that cannot be accomplished using built-in functions (i.e., functions in a spreadsheet programming language). For example, built-in functions may not be usable to sum up all X values for rows associated with a particular team and having a start date equal to the end date. However, this task may be accomplished with an SQL statement. For example, the following SQL statement may be used in the example of FIG. 4A:

SELECT COUNT(*) WHERE A="Team A" AND E=F

Accordingly, in some implementations, by implementing inline SQL queries, in a spreadsheet application, simpler SQL queries may be used in place of more complex built-in functions and/or in place of manual data entry. Accordingly, in some implementations, by implementing inline SQL queries, the system may allow for more efficient use of user time and computer storage resources, and reduce excessive data entry, client device usage, and duplication of the same data in multiple places in a spreadsheet.

In some implementations, in addition to allowing for transformations for a cell, e.g., as in the above examples and as described with respect to method 200 of FIG. 2, SQL statements may be used for full column transformations, e.g., as described with respect to method 300 of FIG. 3.

In the sheet shown in FIG. 4A, in order to display a string, "YES", in column G if the date in column F is earlier than the present date, the following formula made up of built-in functions may be manually copied into each of the cells in column G:

=IF(F:F<TODAY( ), "YES", " ")

Alternatively, the following SQL statement may be applied to the entire column G in the example of FIG. 4A, e.g., by clicking or tapping on the column header for column G and inputting the SQL statement:

=SQL(SELECT "YES" WHERE F<TODAY( ))

In some implementations, SQL statements may also be used to generate one or more new sheets. For example, based on the sheet ("Sheet2") shown in FIG. 4A, a SQL statement may be used to generate another sheet, shown in FIG. 4B, that outputs "Name" and sum of "X" and "Y" for the persons having a team of "Team A" and a start date>2022-05-01. The following SQL statement may be used:

SELECT D AS "Name", B+C AS "Sum of X and Y" FROM SHEET("Sheet2") WHERE A="Team A" AND E>"2022/5/1"

When the above SQL statement is executed, 'D AS "Name"' in the above SELECT clause becomes column A in "Sheet3", and 'B+C AS "Sum of X and Y"' becomes column B, as shown in FIG. 4B.

In some implementations, an SQL statement may be used to express a condition using conditional formatting. For example, the following SQL query may be used to highlight a row having an end date that is earlier than the present date in the example of FIG. 4A:

SELECT TRUE WHERE F<TODAY( )

The scenarios of FIGS. 4A and 4B are for illustrative purposes only. Inline SQL queries may be implemented using techniques described herein for any number of applications.

Figure 5:
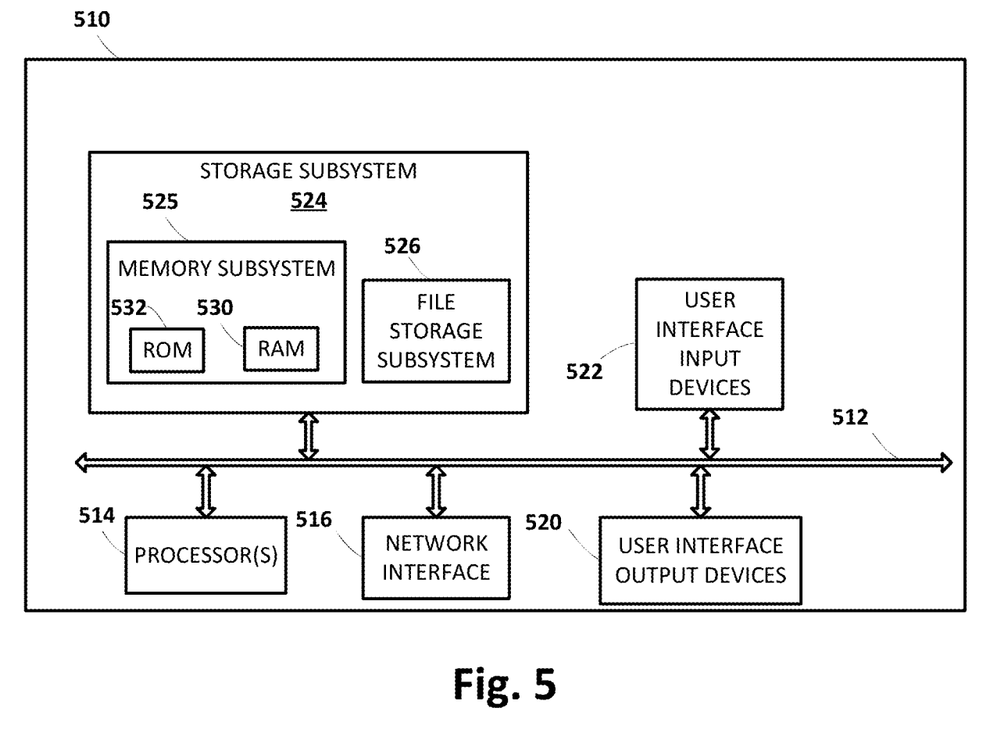
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and 3 as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

Implementations may address problems with excessive data entry, client device usage, and duplication of the same data in multiple places in a spreadsheet by providing methods and systems for implementing inline SQL queries, in a spreadsheet application. Accordingly, through the use of rules that improve computer-related technology, implementations allow computer performance of functions not previously performable by a computer. Additionally, implementations use techniques that are, by definition, rooted in computer technology (e.g., a spreadsheet programming language, SQL programming language, a spreadsheet user interface, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving, via a user interface of a spreadsheet application, first input comprising a structured query language (SQL) statement, the first input being provided in association with a given cell in a given column and a given row in a spreadsheet in the spreadsheet application, and the SQL statement comprising a reference to an additional column in the spreadsheet;
storing the SQL statement in association with the given cell in the spreadsheet;

executing the SQL statement to obtain a result, wherein executing the SQL statement comprises obtaining at least one value from the additional column in the spreadsheet; and displaying the result in association with the given cell in the spreadsheet.

2. The method according to claim 1, wherein:

the SQL statement further comprises a reference to an additional row in the spreadsheet; and obtaining the at least one value from the additional column in the spreadsheet comprises obtaining a value of an additional cell in the spreadsheet, the additional cell being located at an intersection of the additional column and the additional row.

3. The method according to claim 1, wherein obtaining the at least one value from the additional column in the spreadsheet comprises obtaining a value of an additional cell in the spreadsheet, the additional cell being located at an intersection of the additional column and the given row.

4. The method according to claim 1, wherein:

the SQL statement further comprises a reference to an additional spreadsheet, a column in the additional spreadsheet, and a row in the additional spreadsheet; and executing the SQL statement further comprises obtaining a value of a cell in the additional spreadsheet, the cell in the additional spreadsheet being located at an intersection of the column in the additional spreadsheet and the row in the additional spreadsheet.

5. The method according to claim 1, wherein displaying the result in association with the given cell in the spreadsheet comprises displaying the result at a location, in the spreadsheet, at an intersection of the given column and the given row.

6. The method according to claim 1, further comprising, in response to a selection of the given cell via the user interface of the spreadsheet application, displaying the SQL statement in a formula bar, the formula bar being located in the user interface of the spreadsheet application, at a position that is outside of the given cell.

7. The method according to claim 1, wherein the SQL statement is executed by the spreadsheet application.

8. The method according to claim 1, wherein the SQL statement is executed by a user device.

9. The method according to claim 1, wherein the SQL statement is executed by a remote server.

10. A computer program product comprising one or more non-transitory computer-readable storage media having program instructions collectively stored on the one or more computer-readable storage media, the program instructions executable to:

receive, via a user interface of a spreadsheet application, first input comprising a structured query language (SQL) statement, the first input being provided in association with a given column in a spreadsheet in the spreadsheet application, and the SQL statement comprising a reference to an additional column in the spreadsheet;

store the SQL statement in association with the given column in the spreadsheet; and for each of one or more cells in the given column in the spreadsheet:

execute the SQL statement to obtain a result, wherein executing the SQL statement comprises obtaining at least one value from the additional column in the spreadsheet; and display the result in association with one or more of the cells in the given column in the spreadsheet.

11. The computer program product according to claim 10, wherein storing the SQL statement in association with the given column in the spreadsheet comprises storing the SQL statement in association with each of the one or more cells in the given column in the spreadsheet.

12. The computer program product according to claim 10, wherein receiving the first input comprises receiving, via the user interface of the spreadsheet application, a selection of a column header of the given column in the spreadsheet.

13. The computer program product according to claim 10, wherein:

the SQL statement further comprises a reference to a row in the spreadsheet; and obtaining the at least one value from the additional column in the spreadsheet comprises obtaining a value of an additional cell in the spreadsheet, the additional cell being located at an intersection of the additional column and the row.

14. The computer program product according to claim 10, wherein obtaining the at least one value from the additional column in the spreadsheet comprises obtaining a value of an additional cell in the spreadsheet, the additional cell being located at an intersection of the additional column and a row of the cell.

15. The computer program product according to claim 10, wherein displaying the result in association with the cell in the given column in the spreadsheet comprises displaying the result at a location, in the spreadsheet, at an intersection of the given column and a row of the cell.

16. The computer program product according to claim 10, wherein the program instructions are further executable to, in response to a selection of the column header of the given column, via the user interface of the spreadsheet application, display the SQL statement in a formula bar, the formula bar being located in the user interface of the spreadsheet application.

17. A system comprising:

a processor, a computer-readable memory, one or more computer-readable storage media, and program instructions collectively stored on the one or more computer-readable storage media, the program instructions executable to:

receive, via a user interface of a spreadsheet application, first input comprising a structured query language (SQL) statement, the first input being provided in association with a given cell in a given column and a given row in a spreadsheet in the spreadsheet application, and the SQL statement comprising a reference to an additional column in the spreadsheet;

store the SQL statement in association with the given cell in the spreadsheet;

execute the SQL statement to obtain a result, wherein executing the SQL statement comprises obtaining at least one value from the additional column in the spreadsheet; and display the result in association with the given cell in the spreadsheet.

18. The system according to claim 17, wherein:

the SQL statement further comprises a reference to an additional row in the spreadsheet; and obtaining the at least one value from the additional column in the spreadsheet comprises obtaining a value of an additional cell in the spreadsheet, the additional cell being located at an intersection of the additional column and the additional row.

19. The system according to claim 17, wherein obtaining the at least one value from the additional column in the spreadsheet comprises obtaining a value of an additional cell in the spreadsheet, the additional cell being located at an intersection of the additional column and the given row.

20. The system according to claim 17, wherein:
the SQL statement further comprises a reference to an additional spreadsheet, a column in the additional spreadsheet, and a row in the additional spreadsheet; and
executing the SQL statement further comprises obtaining a value of a cell in the additional spreadsheet, the cell in the additional spreadsheet being located at an intersection of the column in the additional spreadsheet and the row in the additional spreadsheet.

\* \* \* \* \*